United States Patent

Kavanagh

[11] Patent Number: 6,046,677
[45] Date of Patent: Apr. 4, 2000

[54] METHOD AND APPARATUS FOR ENSURING PROPER USE OF AN INDICATION DEVICE WITHIN AN ASSEMBLY LINE

[75] Inventor: Bruce W. Kavanagh, Rushsylvania, Ohio

[73] Assignee: Honda of America Mfg., Inc., Marysville, Ohio

[21] Appl. No.: 09/247,799

[22] Filed: Feb. 8, 1999

[51] Int. Cl.[7] .................................................. G08B 21/00
[52] U.S. Cl. ...................... 340/674; 340/673; 340/686.5; 324/226; 324/240
[58] Field of Search .................................... 340/673, 674, 340/675, 676, 540, 686.5, 572.1, 572.4; 324/225, 226, 238, 240; 219/109, 110

[56] References Cited

U.S. PATENT DOCUMENTS

| | | | |
|---|---|---|---|
| 4,017,680 | 4/1977 | Anderson et al. | 348/707 |
| 4,120,629 | 10/1978 | Christian et al. | 425/135 |
| 4,167,004 | 9/1979 | Schenck et al. | 340/679 |
| 4,228,513 | 10/1980 | Doljack | 364/468.15 |
| 4,472,681 | 9/1984 | Toth | 324/226 |
| 4,644,272 | 2/1987 | Janos | 324/240 |
| 4,647,917 | 3/1987 | Anderson, III et al. | 340/572.4 |
| 4,665,392 | 5/1987 | Koontz | 340/674 |
| 4,812,068 | 3/1989 | Seong | 401/195 |
| 5,086,397 | 2/1992 | Schuster et al. | 364/468.17 |
| 5,236,416 | 8/1993 | McDaniel et al. | 604/67 |
| 5,614,109 | 3/1997 | Cecil | 219/109 |
| 5,625,606 | 4/1997 | Openiano | 368/10 |
| 5,635,959 | 6/1997 | Takeuchi et al. | 345/179 |
| 5,715,168 | 2/1998 | Ito | 364/478.03 |
| 5,739,513 | 4/1998 | Watanabe | 235/383 |
| 5,808,265 | 9/1998 | Cecil | 219/109 |
| 5,838,574 | 11/1998 | Olson et al. | 364/478.07 |

OTHER PUBLICATIONS

Mountz 1999 Product Brochure, *TAAMS (Torque Activated AM Signal Wrenches)*, pp. 1–2.
Mountz 1999 Product Brochure, *Mountz Assembly Verifier*, pp. 1–2.

*Primary Examiner*—Daniel J. Wu
*Assistant Examiner*—Van T. Trieu
*Attorney, Agent, or Firm*—Monica H. Choi

[57] ABSTRACT

The present invention warns an operator of failure to properly use an indication device within an assembly line for producing articles of manufacture. The present invention includes a detector, coupled to the indication device, for detecting application of the indication device to a work piece within the assembly line. In addition, the present invention includes a timer, coupled to the detector, for timing a measured time period from a first time point when a prior application of the indication device to a first work piece is detected within the assembly line. The present invention further includes a warning unit, coupled to the timer, for generating an alarm signal if the measured time period is greater than a predetermined time period and if a subsequent application of the indication device to a second work piece has not been detected within the measured time period. The present invention may be used to particular advantage when the indication device is a marker that is used to make a mark on an automotive part to indicate completion of testing the automotive part or to indicate inclusion of a predetermined part to the automotive part. The alarm signal generated by the present invention reminds the operator to use the indication device for each work piece within the assembly line.

29 Claims, 1 Drawing Sheet

6,046,677

METHOD AND APPARATUS FOR ENSURING PROPER USE OF AN INDICATION DEVICE WITHIN AN ASSEMBLY LINE

TECHNICAL FIELD

The present invention relates generally to monitoring systems within assembly lines for producing articles of manufacture, and more particularly to a method and apparatus for ensuring proper use of an indication device within an assembly line.

BACKGROUND OF THE INVENTION

During production of articles of manufacture within an assembly line, indication devices are typically used to keep track of activity related to selected work pieces within the assembly line. Referring to FIG. 1, an example indication device is a marker 102 that is used to mark a work piece to confirm completion of a predetermined treatment to that work piece. In FIG. 1, an example assembly line includes a first work piece 104 having a first bolt 106, a second work piece 108 having a second bolt 110, and a third work piece 112 having a third bolt 114. The articles of manufacture within the assembly line of FIG. 1 may be automotive parts for example. However, the present invention may be applied within assembly lines for producing any type of articles of manufacture as would be apparent to one of ordinary skill in the art from the description herein.

As the assembly line, including the work pieces 104, 108, and 112, progresses, an operator within the assembly line uses the indication device such as the marker 102 to make a mark on a work piece. The mark on a work piece indicates that predetermined treatment has been performed on that work piece such that further treatments may be applied to that work piece. Referring to FIG. 1, for example, an operator within the assembly line makes a first mark 116 on the first work piece 104 after checking that the first bolt 106 has been properly threaded onto the first work piece 104 with a proper torque force. Such a mark 116 on the first work piece 104 ensures that the first work piece 104 meets the quality standards for further processing of the first work piece within the assembly line. Thus, proper use of an indication device, such as the marker 102, on a work piece may indicate completion of testing that work piece.

Alternatively, the marker 102 may be applied to make a mark on a work piece to indicate inclusion of a critical part to the work piece. For example, a mark may be made to an automobile engine to indicate that engine oil has been injected into that automobile engine. With such a mark, an operator within an assembly line may properly run the automobile engine for testing with assurance that engine oil has already been injected into the engine.

Referring to the example of FIG. 1, the operator makes a second mark using the marker 102 on the second work piece 108 after the operator checks that the second bolt 110 has been properly threaded onto the second work piece 108 with a proper torque force. Subsequently, the operator makes a third mark using the marker 102 on the third work piece 112 after the operator checks that the third bolt 114 has been properly threaded onto the third work piece 112 with a proper torque force. If the operator works on the work pieces 104, 108, and 112 using a regular schedule within the assembly line, the marker 102 is used to make a mark on a work piece within every predetermined time period.

Unfortunately, with the prior art indication device, such as the simple marker 102, an operator within an assembly line may fail to properly use the indication device. The operator may properly fail to make a mark on the work piece after also failing to apply the proper treatment to the work piece. Alternatively, the operator may forget to make a mark on a work piece even after proper treatment to the work piece. In either case, a subsequent operator may act to correct an expected flaw. When such a flaw has not actually occurred, both time and money are wasted.

In any case, an improved indication device is desired for ensuring proper use of the indication device on each work piece after applying the proper treatment to each work piece within the assembly line.

SUMMARY OF THE INVENTION

Accordingly, the present invention relates to a method and apparatus for ensuring proper use of an indication device on each work piece during production of articles of manufacture within an assembly line. More specifically, the method and apparatus of the present invention warns an operator of failure to properly use the indication device on a work piece within the assembly line for producing the articles of manufacture.

Generally, the present invention includes a detector, coupled to the indication device, for detecting application of the indication device to a work piece within the assembly line. In addition, the present invention includes a timer, coupled to the detector on the indication device, for timing a measured time period from a first time point when a prior application of the indication device to a first work piece is detected within the assembly line. The present invention further includes a warning unit, coupled to the timer, for generating an alarm signal from the indication device if the measured time period is greater than a predetermined time period and if a subsequent application of the indication device to a second work piece has not been detected within the measured time period.

The present invention may be used to particular advantage when the timer counts down from the predetermined time period. In that case, the timer is reset to the predetermined time period, and the operator is warned with the alarm signal if the subsequent application of the indication device to the second work piece has not been detected when the timer has counted down to zero from the predetermined time period.

The value of the predetermined time period depends on the type of assembly line and on the specific operation within the assembly line for which the indication device is used. In one aspect of the present invention, the value of the predetermined time period may be adjusted and set by the operator depending on the type of assembly line and on the specific operation for which the indication device is used.

The present invention may be used to particular advantage when the indication device is a marking device for marking a work piece within the assembly line to indicate completion of testing the work piece or to indicate inclusion of a predetermined part to the work piece.

In this manner, the present invention monitors the proper use of an indication device. The alarm signal generated by the present invention reminds the operator to apply proper treatment to the work piece and to apply the indication device to the work piece after proper treatment to the work piece.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1 and 2 refer to elements having similar structure and function.

DETAILED DESCRIPTION

The present invention is described with a marker as an example indication device used within an assembly line for producing articles of manufacture. However, the present invention may be used with any other types of indication devices used within an assembly line. For example, an optical scanner may be used as the indication device to read a respective bar-code serial number from each work piece within an assembly line. In that case, reading of the respective bar-code serial number for a work piece while still providing an alarm from the device itself indicates proper treatment to that work piece.

Figure 1:
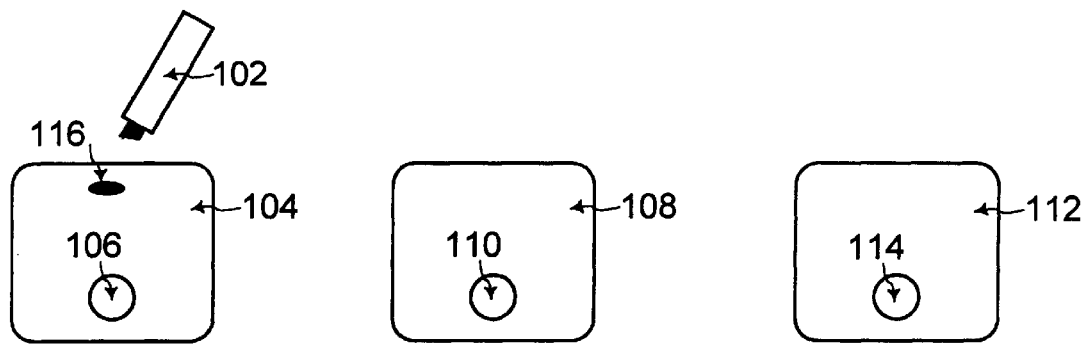
FIG. 1 shows a plurality of work pieces within an assembly line and shows a marker as an example indication device used within the assembly line.
Figure 2:
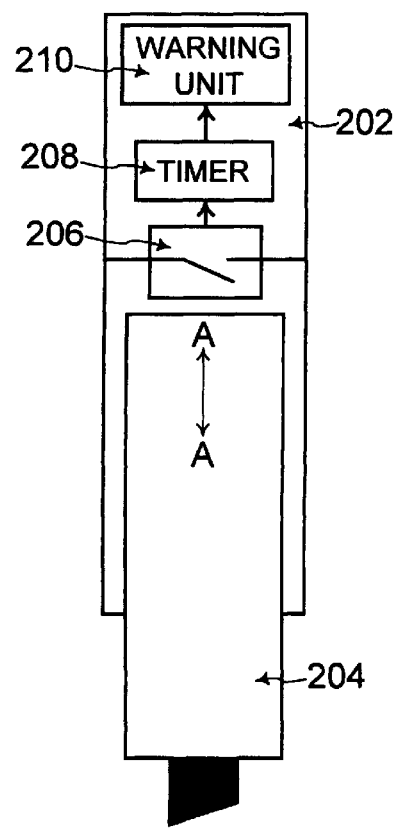
FIG. 2 shows a block diagram of the components for warning an operator of failure to properly use an indication device within an assembly line for producing articles of manufacture, according to an example embodiment of the present invention.

Referring to FIG. 2, the present invention includes a housing unit 202 for carrying an indication device such as a marker 204. The marker 204 is similar to the marker 102 of FIG. 1 and is used to mark a work piece by an operator to indicate proper treatment to that work piece within the assembly line.

The housing unit 202 further includes a detector 206 operatively coupled to the indication device 204 for detecting application of the indication device 204 to a work piece. In the example embodiment of FIG. 2, the detector 206 detects when the marker 204 has been applied on a work piece to make a mark on the work piece. The marker 204 floats and may slide back and forth within the housing 202 as indicated by direction line A—A in FIG. 2.

When an operator uses the marker 204 to make a mark on a work piece, the marker 204 is pushed against the detector 206 as the marker 204 touches and pushes against a work piece during marking of the work piece. The detector 206 may be implemented with a switch that turns on when the marker 204 is pushed against the detector 206. The turning on of the switch indicates that the marker 204 is currently being applied to make a mark on a work piece.

Alternatively, the detector 206 may be implemented with a piezo-electric resistor that outputs an increase in voltage when the marker 204 is pushed against the detector 206. In that case, the sudden increase in voltage across the piezo-electric resistor indicates that the marker 204 is currently being applied to make a mark on a work piece.

The present invention may be used with any other type of sensor within the detector 206 for detecting that the marker 204 is currently being applied to make a mark on a work piece, as would be apparent to one of ordinary skill in the art from the description herein.

In addition, the present invention includes a timer 208 that is operatively coupled to the detector 206. A warning unit 210 is coupled to the timer 208. The operation of the present invention for warning an operator of failure to properly use an indication device within an assembly line is now described.

The operation of the present invention is described with the marker 204 as an example indication device. The marker 204 is used in a manner similar to the marker 102 as described with respect to FIG. 1. As the assembly line, including the work pieces 104, 108, and 112, progresses, an operator within the assembly line uses the indication device such as the marker 204 to make a mark on a work piece. The mark on a work piece indicates that a predetermined treatment has been performed on that work piece such that further treatments may be applied to that work piece.

Referring to FIG. 1, for example, an operator within the assembly line makes a first mark 116 on the first work piece 104 after checking that the first bolt 106 has been properly threaded onto the first work piece 104 with a proper torque force. Such a mark 116 on the first work piece 104 ensures that the first work piece 104 meets the quality standards for further processing of the first work piece within the assembly line. Thus, proper use of an indication device, such as the marker 204, on a work piece may indicate completion of testing that work piece.

Then, the operator makes a second mark using the marker 204 on the second work piece 108 after the operator checks that the second bolt 110 has been properly threaded onto the second work piece 108 with a proper torque force. Subsequently, the operator makes a third mark using the marker 204 on the third work piece 112 after the operator checks that the third bolt 114 has been properly threaded onto the third work piece 112 with a proper torque force. If the operator works on the work pieces 104, 108, and 112 within the assembly line using a regular schedule, the marker 204 should be used to make a mark on a work piece within every predetermined time period.

The value of the predetermined time period depends on the type of assembly line and the regular schedule for that type of assembly line. In addition, the value of the predetermined time period depends on the specific operation within the assembly line for which the indication device is used.

Referring to FIG. 2, with the present invention, the detector 206 detects each time point when the marker 204 is being applied to a work piece. The detector 206 detects for a touch of the marker 204 to a work piece for making a mark to that work piece within the assembly line.

The detector 206 detects a prior application of the indication device to a first work piece at a first time point within the assembly line. For the example indication device of the marker 204, the detector 206 detects a prior touch for marking the first work piece by the marker 204 at the first time point within the assembly line.

With detection of the first application of the indication device at the first time point, the timer 208 is reset to begin timing a measured time period from the first time point. If the measured time period increases to be greater than a predetermined time period and if a subsequent application of the indication device to a second work piece has not been detected within the measured time period, then the warning unit 210 warns the operator within the assembly line with an alarm signal.

For the example indication device of the marker 204, the warning unit 210 generates the alarm signal if a subsequent touch for marking a second work piece by the marker 204 has not been detected by the detector 206 by the time the measured time period exceeds the predetermined time period.

The alarm signal may include at least one, and preferably both, of an audio alarm signal and/or a visual alarm as known to one of ordinary skill in the art. The alarm signal warns the operator that the indication device has not subsequently been used on another work piece within the predetermined time period since the indication device was previously used. If an operator within the assembly line treats the work pieces according to a regular schedule, then the indication device should be used periodically every predetermined time period.

When an alarm signal is generated by the warning unit 210 of the present invention, the operator may have failed to apply the indication device to a work piece after proper treatment to the work piece. Alternatively, the operator may have failed to apply the indication device to the work piece after also failing to apply the proper treatment to the work piece. The alarm signal warns an operator of these undesired situations, and the operator may then take proper action to correct these undesired situations. The operator may take this corrective action before a work piece is more than one workstation away, eliminating the need for a subsequent operator to correct the situation.

The present invention may be used to particular advantage when the timer 208 counts down from the predetermined time period. In that case, the timer 208 is reset to the predetermined time period when the detector 206 detects the prior application of the indication device 204 to the first work piece at the first time point. Then, the timer 208 counts down from that predetermined time period at the first time point. If the timer 208 counts down to zero from the predetermined time period before a subsequent application of the indication device to a second work piece has been detected by the detector 206, then the warning unit 210 generates the alarm signal.

The value of the predetermined time period depends on the type of assembly line and on the specific operation within the assembly line for which the indication device is used. In one aspect of the present invention, the value of the predetermined time period may be adjusted and set by the operator depending on the type of assembly line and on the specific operation for which the indication device is used.

In this manner, the present invention monitors the proper use of an indication device within an assembly line. An operator within the assembly line is warned with an alarm signal when failure to properly use the indication device has been detected. With generation of the alarm signal, the operator may take action to correct the failure to properly use the indication device. The operator may take this corrective action before a work piece is more than one workstation away, eliminating the need for a subsequent operator to correct the situation.

In some situations, constant warning of the operator with the alarm signal may not be desired. In that case, the warning unit 210 may be turned off to disable the alarm signal from being generated.

The foregoing is by way of example only and is not intended to be limiting. For example, the present invention has been described for a marker as an example indication device. However, the present invention may be used with any type of indication device and with an appropriate detector 206 which can detect for application of that indication device, as known to one of ordinary skill in the art. For example, an optical scanner may be used as the indication device to read a respective bar-code serial number from each work piece within an assembly line. In that case, reading of the respective bar-code serial number for a work piece indicates proper treatment to that work piece while still providing an alarm from the device itself.

Another example of an indication device is a touch device which is used to touch a work piece (without necessarily making a mark on the work piece) after proper treatment to the work piece. In that example indication device, an alarm signal is generated if a touch to the work piece is not detected within a predetermined time period from a prior touch to another work piece.

In addition, the present invention has been described for an indication device which is used for indicating completion of testing an work piece or for indicating inclusion of a predetermined part to the work piece. However, the present invention can be used with indication devices for conveying other types of information about a work piece, as would be apparent to one of ordinary skill in the art from the description herein.

The present invention is limited only as defined in the following claims and equivalents thereof.

I claim:

1. A method for warning an operator of failure to properly use an indication device within an assembly line for producing articles of manufacture, the method including the steps of:
   A. detecting a prior application of said indication device by said operator to a first work piece at a first time point within said assembly line;
   B. resetting a timer on said indication device to begin timing a measured time period from said first time point; and
   C. warning said operator with an alarm signal from said indication device if said measured time period is greater than a predetermined time period and if a subsequent application of said indication device by said operator to a second work piece has not been detected within said measured time period.

2. The method of claim 1, wherein said timer counts down from said predetermined time period, and wherein said timer is reset to said predetermined time period in said step B, and wherein said operator is warned in said step C with said alarm signal if said subsequent application of said indication device to said second work piece has not been detected when the timer has counted down to zero from said predetermined time period.

3. The method of claim 1, wherein said indication device is a marking device for marking a work piece within said assembly line to indicate completion of testing said work piece.

4. The method of claim 1, wherein said indication device is a marking device for marking a work piece within said assembly line to indicate inclusion of a predetermined part to said work piece.

5. The method of claim 1, wherein said articles of manufacture are automotive parts.

6. The method of claim 1, wherein said alarm signal includes at least one of an audio alarm and a visual alarm.

7. The method of claim 1, wherein said alarm signal includes both an audio alarm and a visual alarm.

8. The method of claim 1, further including the step of:
   disabling said alarm signal when warning of said operator is not desired.

9. The method of claim 1, wherein the value of said predetermined time period is adjustable by said operator.

10. A method for warning an operator of failure to properly use a marker used in connection with an indication device within an assembly line for producing automotive parts, the method including the steps of:
    A. detecting a prior touch made by said operator for marking a first work piece with said marker at a first time point within said assembly line;
    B. resetting a timer on said indication device to begin counting down from a predetermined time period at said first time point when said prior touch has been detected, wherein the value of said predetermined time period is adjustable by said operator;
    C. warning said operator with both an audio alarm and a visual alarm from said indication device if said timer has counted down to zero before a subsequent touch made by said operator for marking a second work piece with said marker has been detected; and D. disabling said alarm signal when warning of said operator is not desired, wherein said marker is used by said operator to mark an automotive part to indicate a selected one of completion of testing said automotive part and of inclusion of a predetermined part to said automotive part within said assembly line.

11. An apparatus for warning an operator of failure to properly use an indication device within an assembly line for producing articles of manufacture, the apparatus comprising:

a detector, coupled to the indication device, for detecting application of said indication device by said operator to a work piece within said assembly line;

a timer, on said apparatus and coupled to the detector, for timing a measured time period from a first time point when a prior application of said indication device by said operator to a first work piece is detected within said assembly line; and a warning unit, on said apparatus and coupled to the timer, for generating an alarm signal if said measured time period is greater than a predetermined time period and if a subsequent application of said indication device by said operator to a second work piece has not been detected within said measured time period.

12. The apparatus of claim 11, wherein said timer counts down from said predetermined time period, and wherein said timer is reset to said predetermined time period at said first time point when said prior application is detected, and wherein said operator is warned with said alarm signal if said subsequent application has not been detected when the timer has counted down to zero from said predetermined time period.

13. The apparatus of claim 11, wherein said indication device is a marking device for marking a work piece within said assembly line to indicate completion of testing said work piece.

14. The apparatus of claim 11, wherein said indication device is a marking device for marking a work piece within said assembly line to indicate inclusion of a predetermined part to said work piece.

15. The apparatus of claim 11, wherein said articles of manufacture are automotive parts.

16. The apparatus of claim 11, wherein said alarm signal includes at least one of an audio alarm and a visual alarm.

17. The apparatus of claim 11, wherein said alarm signal includes both an audio alarm and a visual alarm.

18. The apparatus of claim 11, wherein the value of said predetermined time period is adjustable by said operator.

19. The apparatus of claim 11, wherein said warning unit is turned off to disable said alarm signal when warning of said operator is not desired.

20. An apparatus for warning an operator of failure to properly use a marker within an assembly line for producing automotive parts, the apparatus comprising:

a detector, coupled to the marker, for detecting a touch by said operator to a work piece with said marker within said assembly line;

a timer, on said apparatus and coupled to the detector, for timing a measured time period from a first time point when a prior touch by said operator for marking a first work piece with said marker is detected within said assembly line, said timer being reset to count down from a predetermined time period when said prior touch is detected at said first time point, and wherein the value of said predetermined time period is adjustable by said operator; and a warning unit, on said apparatus and coupled to the timer, for generating an alarm signal if a subsequent touch by said operator for marking a second work piece with said touching device has not been detected when the timer has counted down to zero from said predetermined time period, wherein said marker is used to mark an automotive part to indicate a selected one of completion of testing said automotive part and of inclusion of a predetermined part to said automotive part within said assembly line, and wherein said warning unit is turned off to disable said alarm signal when warning of said operator is not desired.

21. An apparatus for warning an operator of failure to properly use an indication device within an assembly line for producing articles of manufacture, the apparatus comprising:

a detector, coupled to the indication device, for detecting application of said indication device by said operator to a work piece within said assembly line;

a timer, on said apparatus and coupled to the detector, for timing a measured time period from a first time point when a prior application of said indication device by said operator to a first work piece is detected within said assembly line;

a warning unit, on said apparatus and coupled to the timer, for generating an alarm signal if said measured time period is greater than a predetermined time period and if a subsequent application of said indication device by said operator to a second work piece has not been detected within said measured time period; and a housing unit that carries said indication device, said detector, said timer, and said warning unit, said housing unit being hand-held by said operator during said application of said indication device by said operator.

22. The apparatus of claim 21, wherein said timer counts down from said predetermined time period, and wherein said timer is reset to said predetermined time period at said first time point when said prior application is detected, and wherein said operator is warned with said alarm signal if said subsequent application has not been detected when the timer has counted down to zero from said predetermined time period.

23. The apparatus of claim 21, wherein said indication device is a marking device for marking a work piece within said assembly line to indicate completion of testing said work piece.

24. The apparatus of claim 21, wherein said indication device is a marking device for marking a work piece within said assembly line to indicate inclusion of a predetermined part to said work piece.

25. The apparatus of claim 21, wherein said articles of manufacture are automotive parts.

26. The apparatus of claim 21, wherein said alarm signal includes at least one of an audio alarm and a visual alarm.

27. The apparatus of claim 21, wherein said alarm signal includes both an audio alarm and a visual alarm.

28. The apparatus of claim 21, wherein the value of said predetermined time period is adjustable by said operator.

29. The apparatus of claim 21, wherein said warning unit is turned off to disable said alarm signal when warning of said operator is not desired.

* * * * *